May 11, 1926.
W. G. WATSON
1,583,817
APPARATUS FOR MAKING PLATE GLASS
Filed August 18, 1923     4 Sheets-Sheet 1
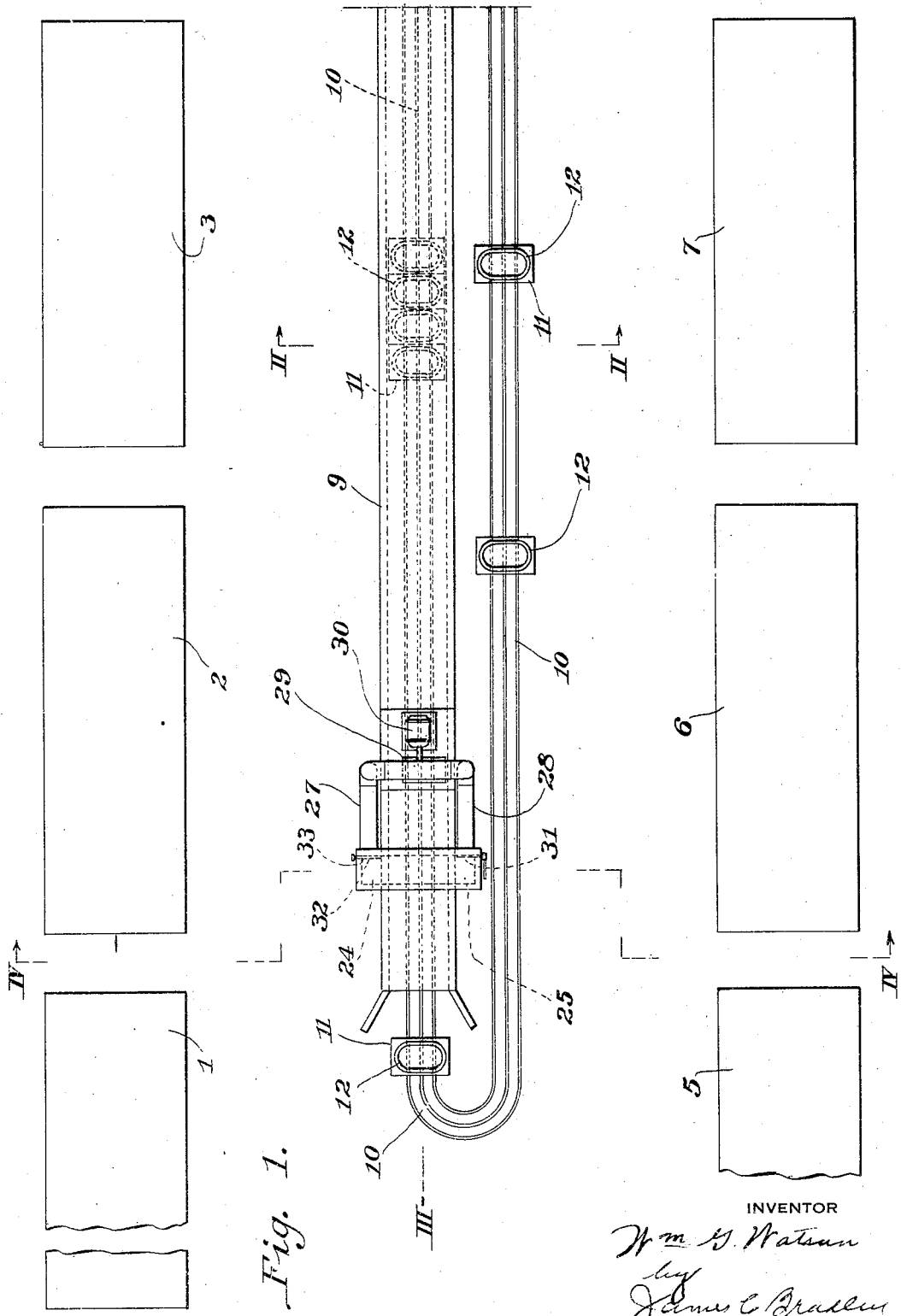

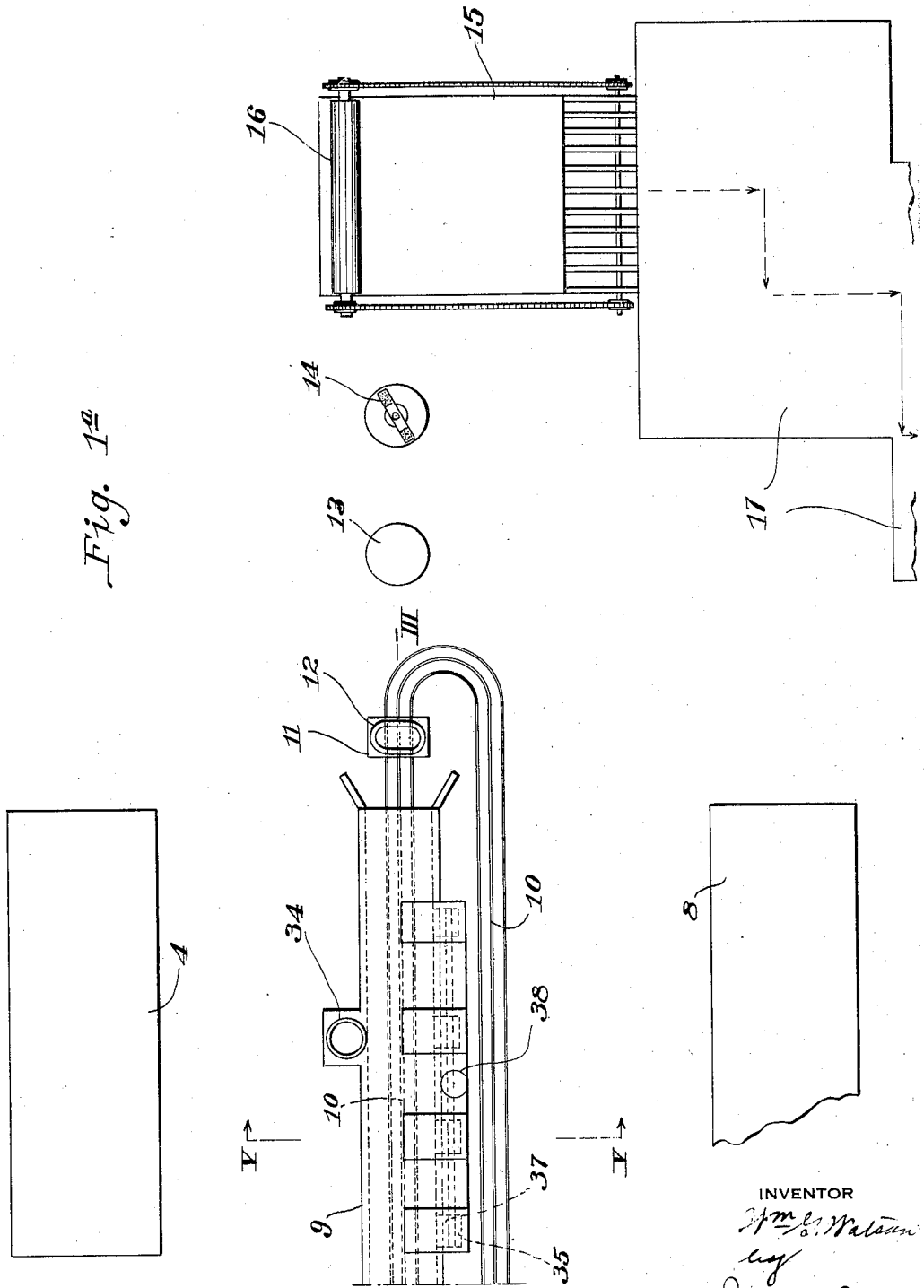

May 11, 1926.

W. G. WATSON 1,583,817

APPARATUS FOR MAKING PLATE GLASS

Filed August 18, 1923    4 Sheets-Sheet 3

INVENTOR
Wm G. Watson
by
James C. Bradley
atty

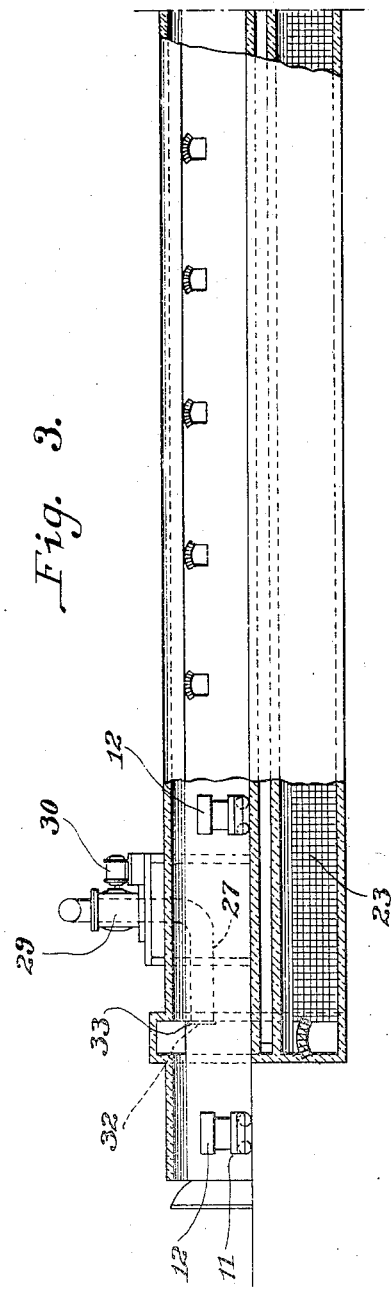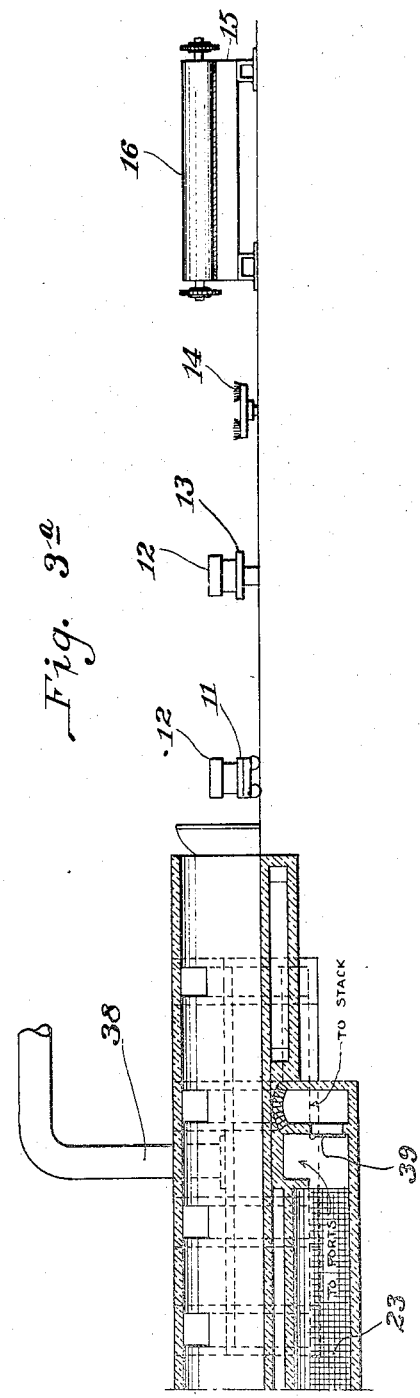

Patented May 11, 1926.

1,583,817

UNITED STATES PATENT OFFICE.

WILLIAM G. WATSON, OF FORD CITY, PENNSYLVANIA, ASSIGNOR TO PITTSBURGH PLATE GLASS COMPANY, A CORPORATION OF PENNSYLVANIA.

APPARATUS FOR MAKING PLATE GLASS.

Application filed August 18, 1923. Serial No. 658,174.

Figure 2:
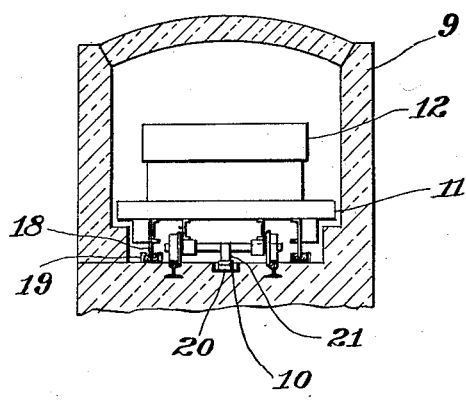
Figure 5:
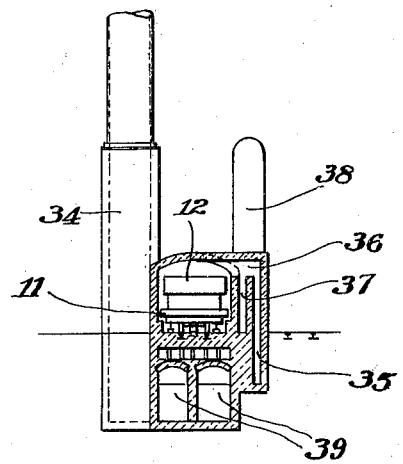
Figure 4:
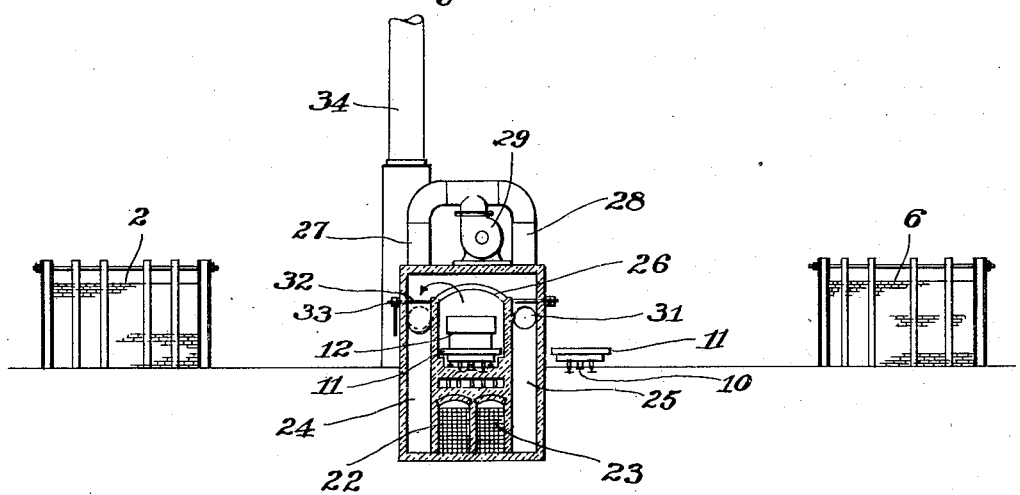

The invention relates to an apparatus for making plate glass and particularly the portion of the operation leading up to the casting of the sheet upon the table. It has for its principal objects the provision of an apparatus, by whose use; (1) the necessity for skimming the pots preliminary to casting is avoided, thus reducing the labor involved and increasing production by saving the surface glass otherwise skimmed off; (2) the life of the pots used is increased incident to the shorter period of time which they are exposed to the extreme heat of the melting furnace; (3) the loss, due to breakage, is decreased due to the more uniform conditions as to temperature in the glass at the time of "teeming" or casting the glass upon the table; and (4) the capacity of the plant is increased, as the "hold over" in the melting furnaces is reduced thus giving an opportunity for the melting and fining of more glass. One embodiment of the invention is illustrated in the accompanying drawings wherein:

Figures 1 and 1ª together constitute a plan view of the apparatus. Fig. 2 is a section on an enlarged scale on the line II—II of Fig. 1. Figs. 3 and 3ª together constitute a partial side elevation and partial section along the line III—III of Fig. 1. Fig. 4 is a section on the line IV—IV of Fig. 1. And Fig. 5 is a section on the line V—V of Fig. 1ª.

Referring to the arrangement shown in Fig. 1, 1—8 are a series of pot furnaces which are of the ordinary type provided with suitable heating means and with the usual side openings for the removal of the pots; 9 is a tunnel kiln through which the pots are to be carried preliminary to casting; 10 is an endless track which carries cars 11 which support the pots 12; 13 is the pot turtle upon which the pots are placed after passing through the lehr preliminary to the casting operation; 14 is a brush for cleaning the bottom of the pot after it is lifted from the pot turtle by the teeming crane; 15 is the casting table provided with the usual roll 16; and 17 are the ovens constituting the entrance end of the lehr to which the glass sheets are supplied from the casting table.

The furnace or kiln is preferably of the cross section indicated in Fig. 2, and through this furnace pass the cars 11 preferably of the general construction indicated in Fig. 2 and provided with the depending plates 18 fitting in boxes 19 open at their tops and partially filled with sand, thus making a seal to prevent access of the heated gases, supplied to the upper portion of the furnace to the iron work of the cars therebeneath. The cars may be moved through the kiln by any desired means but this is preferably accomplished by means of a drag chain 20 releasably engaged with suitable hooks 21 or other equivalent devices carried by the car bodies. Any desired means may be employed for driving the chain.

Extending longitudinally throughout the length of the furnace and therebeneath are the regenerator chambers 22 and 23 provided with suitable checker work and connected at their forward ends with the passages 24 and 25 leading downwardly from the space 26 which communicates with the end of the kiln above the cars. Also communicating with the passages 24 and 25 are the pipes 27 and 28 leading from the fan 29 driven by a suitable motor 30. At the entrance to the passages 24 and 25 are the valves 31 and 32, each consisting of a flap pivoted at 33 (Fig. 3). When the valve 32 is at the position indicated in Fig. 3, the pipe 27 is closed while the passage and opening at the upper end of the passage 24 are open. At this time the pipe 28 is open and the passage and the opening at the top of the passage 25 are closed. This permits the heated gases from the end of the furnace to pass down through the passage 24 and into the chamber 22, while at the same time air is supplied from the fan through the pipe 28 and passage 25 to the end of the chamber 23. At the other end of the chambers 22 and 23, communication is had with the stack 34 and with the air passages 35 which lead to the ports 36 discharging into the kiln. Also discharging through the same ports 36 is a supply of gas from the passage 37, such passage being connected to the gas main 38. A reversing door is provided at 39 (Fig. 5) for each chamber so that the gases passing through the chambers 22 and 23 may be either directed to the stack or to the passage 35, leading to the ports 36. With the parts adjusted as indicated in Fig. 4, the door at the right hand end of the chambers will be so adjusted that the hot gases of combustion from the chamber 22 will pass to the stack while the hot air, after passing through the chamber 23, will discharge through the passage 35 to the ports 36. At suitable intervals, the valves are reversed in accordance with the principle well known in connection with the generator furnaces.

In carrying out the operation the pots or molten glass are carried from the pot furnaces to the various cars on the track 10 and conveyed to the left hand end of the kiln. They are moved slowly along through the kiln until they emerge at the right hand end, the rate of movement and the temperature of the furnace of the kiln being so adjusted that when the pots emerge from the kiln the glass is at a proper temperature for casting and uniformly heated. When a pot is to be cast, it is transferred by means of a suitable crane to the pot turtle 13 where it is released from the crane and engaged by the usual teeming crane which first carries it over the pot brush 14 which removes any cinders or dirt from the bottom of the pot, after which it is carried to the casting table and poured and teemed in the usual way. The various cars as they are relieved from their pots at the outer end of the kiln are returned on the outside section of the track, and during this return movement they are again loaded by pots removed from the various furnaces, suitable cranes of the usual type being employed for this purpose.

The practice of the process as just described involves a number of advantages as heretofore stated. Each pot of metal is delivered at the outlet end of the kiln at the same temperature, which is the one best suited for casting and the glass in the pot is uniformly heated. Since the outlet end of the kiln is close to the casting table, the interval of time between removal of the pot from the kiln and the pouring of the glass upon the table is relatively short so that there is no opportunity for the formation of the skin of glass upon the surface and the accustomed skimming is therefore dispensed with, thus saving considerable labor and involving an increased production. The life of the pots is also considerably increased, since they are not exposed to the severe temperature conditions ordinarily present where pots are held over for a long period in the pot furnace preliminary to casting. The capacity of the furnaces is also augmented since the long holdover in these furnaces which is required under certain conditions is avoided, thus leaving the furnace free in a shorter period for the next melting operation. Other advantages incident to the operation, and the particular apparatus employed for carrying it out will readily be apparent to those skilled in the art.

What I claim is:

1. Apparatus for making plate glass comprising a pot melting furnace, a casting table, and a tunnel soaking kiln with its discharge end located at a point adjacent the casting table, and means for carrying the glass melting pots, containing the glass which has been melted and fined in the furnace through the kiln.

2. Apparatus for making plate glass comprising a plurality of pot melting furnaces, a casting table, and a tunnel soaking kiln with its discharge end located at a point adjacent the casting table, and means for carrying the glass melting pots, containing the glass which has been melted and fined in the furnaces through the kiln.

In testimony whereof, I have hereunto subscribed my name this 31 day of July, 1923.

WILLIAM G. WATSON.